United States Patent
Melzig

(10) Patent No.: US 9,116,075 B2
(45) Date of Patent: Aug. 25, 2015

(54) METHOD FOR CHECKING A FUNCTION OF AN OUTLET VALVE

(71) Applicant: Dr. Ing. h.c. F. Porsche Aktiengesellschaft, Stuttgart (DE)

(72) Inventor: Thomas Melzig, Hoefingen (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 0 days.

(21) Appl. No.: 14/178,323

(22) Filed: Feb. 12, 2014

(65) Prior Publication Data

US 2014/0245823 A1     Sep. 4, 2014

(30) Foreign Application Priority Data

Mar. 4, 2013   (DE) .......................... 10 2013 102 071

(51) Int. Cl.
| | |
|---|---|
| *G01M 15/10* | (2006.01) |
| *F02D 41/22* | (2006.01) |
| *F02D 41/00* | (2006.01) |
| *F02D 9/04* | (2006.01) |
| *F02D 13/02* | (2006.01) |

(52) U.S. Cl.
CPC ........... *G01M 15/106* (2013.01); *F02D 41/221* (2013.01); *F02D 9/04* (2013.01); *F02D 13/0284* (2013.01); *F02D 2041/001* (2013.01)

(58) Field of Classification Search
CPC ... F02D 41/221; F02D 2041/001; F02D 9/04; F02D 13/0284; G01M 15/106
USPC ........................................ 73/114.76, 114.79
See application file for complete search history.

(56) References Cited

U.S. PATENT DOCUMENTS

| | | | | |
|---|---|---|---|---|
| 5,632,257 | A  * | 5/1997 | Machida et al. ............... | 123/435 |
| 7,905,085 | B2 * | 3/2011 | Henning et al. ................. | 60/277 |
| 7,908,913 | B2 * | 3/2011 | Cinpinski et al. ........... | 73/114.79 |
| 8,006,670 | B2 * | 8/2011 | Rollinger et al. ............. | 123/481 |
| 8,301,362 | B2 * | 10/2012 | Buslepp et al. ................ | 701/114 |
| 8,336,291 | B2 * | 12/2012 | Hanari et al. ................... | 60/277 |
| 8,677,975 | B2 * | 3/2014 | Auclair et al. ................. | 123/435 |
| 2004/0129238 | A1 | 7/2004 | Nishida | |
| 2006/0196170 | A1* | 9/2006 | Henning et al. ................ | 60/286 |
| 2011/0137509 | A1 | 6/2011 | Sarac | |
| 2011/0144888 | A1* | 6/2011 | Rollinger et al. ............. | 701/103 |

FOREIGN PATENT DOCUMENTS

| | | |
|---|---|---|
| DE | 102004001102 A1 | 8/2004 |
| DE | 102008001099 A1 | 10/2009 |

* cited by examiner

*Primary Examiner* — Freddie Kirkland, III
(74) *Attorney, Agent, or Firm* — Leydig, Voit & Mayer, Ltd.

(57) ABSTRACT

A method for checking a function of an outlet valve of an internal combustion engine includes sensing an exhaust gas pressure in an exhaust section of the internal combustion engine. The sensed exhaust gas pressure is compared with a comparison value so as to provide a comparison result and the function of the outlet valve is evaluated as a function of the comparison result.

10 Claims, 2 Drawing Sheets

METHOD FOR CHECKING A FUNCTION OF AN OUTLET VALVE

CROSS REFERENCE TO RELATED APPLICATIONS

This application claims priority from German Patent Application No. DE 10 2013 102 071.2, filed Mar. 4, 2013, which is hereby incorporated by reference herein in its entirety.

FIELD

The invention relates to a method for checking a function of an outlet valve.

BACKGROUND

In the prior art, it is known from DE 10 2008 001 009 A1 to carry out a diagnosis of a function of one or more inlet and/or outlet valves which can be actuated in a variable fashion in an internal combustion engine with the following steps: determining a modulated pressure indication which makes available an indication about a pressure in an air system of the internal combustion engine, by means of a pressure profile model, wherein the pressure profile model describes a pressure profile of a fault-free internal combustion engine as a function of an operating point; providing an indication of the actual instantaneous pressure in the air system; acquiring a deviation variable, as a function of the modeled pressure indication and the indication of the actual pressure in the air system; detecting a fault in the functioning of the inlet valve and/or outlet valve as a function of the deviation variable.

SUMMARY

In an embodiment, the present invention provides a method for checking a function of an outlet valve of an internal combustion engine including sensing an exhaust gas pressure in an exhaust section of the internal combustion engine. The sensed exhaust gas pressure is compared with a comparison value so as to provide a comparison result and the function of the outlet valve is evaluated as a function of the comparison result.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
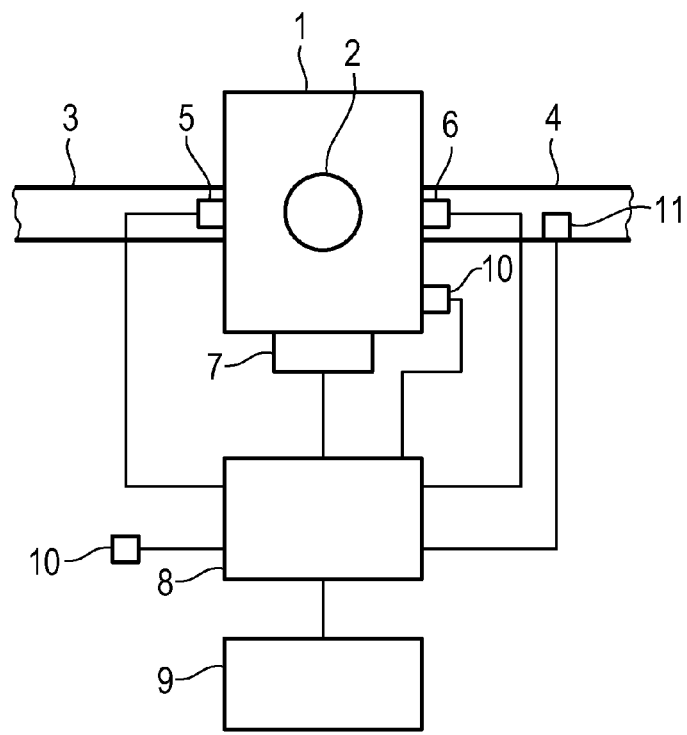
FIG. 1 shows a schematic design of an internal combustion engine.

An aspect of the invention is to provide an improved method for checking a function of an outlet valve of an internal combustion engine.

One advantage of the described method is that the function of the outlet valve, in particular of an outlet valve which can be actuated in a variable fashion, can be sensed and checked precisely. This is done in that an exhaust gas pressure in an exhaust section of the internal combustion engine is sensed and compared with a comparison value. The function of the outlet valve is evaluated as a function of the comparison result. In this way, for example a faulty function of the outlet valve, in particular a faulty function of the variable actuation of the outlet valve can be sensed. By sensing the exhaust gas pressure the method of functioning of the outlet valve can be checked very precisely. The exhaust gas pressure depends very substantially on the correct function of the outlet valve.

In one embodiment, the pressure is sensed by means of a pressure sensor. The use of the pressure sensor provides a simple, cost-effective and precise method for sensing the pressure in the exhaust gas system.

In one embodiment, a pressure value is used as the comparison value. By using the pressure value, it is possible to check, by means of a simple threshold comparison, whether the pressure in the exhaust section reaches, exceeds or undershoots the pressure value. As a result, it is possible to detect with a simple comparison whether the outlet valve is functioning correctly.

In a further embodiment, a pressure gradient is used as the comparison value. The use of the pressure gradient provides a further possibility for checking the correct method of functioning of the outlet valve. In particular, the pressure gradient can, in comparison with the pressure value, additionally permit information about the opening behavior of the outlet valve.

In a further embodiment, an integral over a time profile of the pressure value in the exhaust section is used as a comparison value. As a result, precise checking of the function of the outlet valve is provided. The use of the integral of the pressure profile permits more precise comparison of the method of functioning of the outlet valve. In particular, precise evaluation of the malfunction of the outlet valve can be made possible.

In a further exemplary embodiment, the comparison value is defined as a function of a time interval between sensing of the pressure value in the exhaust section and a setpoint opening time of the outlet valve. This method permits precise checking of the functional capability of the outlet valve. The pressure profile in the exhaust section depends chronologically on the opening time of the outlet valve. Precise individual sections of the opening time of the outlet valve can be checked by defining the comparison value as a function of the time interval between the setpoint opening time and the time of the sensing of the pressure value. For example, the actual opening time and the chronological behavior of the opening i.e. the increase in opening cross section and/or the closing i.e. the decrease in the opening cross section of the outlet valve can be checked. More precise assessment of the functional capability of the outlet valve is therefore possible.

In one embodiment a plurality of pressure values are sensed in chronological succession in the exhaust section, wherein an integral is acquired over the pressure profile in the exhaust section, and wherein an integral over a setpoint pressure profile is used as a comparison value. As a result, more precise evaluation of the function of the outlet valve is possible.

In a further embodiment, the comparison value is defined as a function of a time interval between sensing of the pressure value and a setpoint opening time of the outlet valve. As a result, precise evaluation of the function of the outlet valve is possible.

FIG. 1 shows in a schematic illustration an internal combustion engine 1 which has a combustion chamber 2, an intake section 3 and exhaust section 4. The internal combustion engine 1 has an inlet valve 5 via which air is led into the combustion chamber 2. In addition, the internal combustion engine 1 has an outlet valve 6 via which exhaust gases are output into the exhaust section 4. Furthermore, an injection system 7 is provided via which fuel is injected either into the intake section 3 or directly into the combustion chamber 2. Depending on the design of the internal combustion engine, a spark plug or glow plug can be provided for igniting the combustion.

In addition, a computing unit 8 is provided which can perform the function of a control device and is connected to the injection system 7, the inlet valve 5 and the outlet valve 6 via control lines. In the illustrated embodiment, the inlet valve and/or the outlet valve is embodied with a variable valve controller. The variable valve controller can be embodied either mechanically and/or at least partially or completely electrically. For the electrical actuation of the variable valve controller of the inlet and/or outlet valves 5, 6, the computing unit 8 is connected via the control lines to the inlet valve 5 or to the outlet valve 6. The computing unit 8 is additionally connected to a pressure sensor 11 which is arranged in the exhaust section. The computing unit 8 senses the pressure prevailing in the exhaust section by means of the pressure sensor 11.

The control device 8 is connected to a data memory 9. Furthermore, a sensor 10 is provided which is connected to the computing unit 8. Via the sensor 10 the computing unit 8 senses for example operating parameters of the internal combustion engine 1 such as, for example, the rotational speed and/or a driver's request, i.e. an accelerator pedal position. Combustion is controlled by corresponding actuation of the injection system 7 and of the variable valve controller of the inlet and/or outlet valves 5, 6 as a function of the sensed driver's request and as a function of the sensed operating parameters of the internal combustion engine 1. Furthermore, characteristic curves, characteristic diagrams or programs, with which parameters such as, for example, the injection time, injection quantity, opening time and closing time of the inlet/outlet valves are stored as a function of the driver's request and of operating conditions of the internal combustion engine, are stored in the data memory 9.

For example, the computing unit 8 can select, for example, one of two stroke curves for opening and closing the outlet valve 6 and/or the inlet valve 5, as a function of the present driver's request and the operating state of the internal combustion engine 1. The combustion process, in particular the outputting of torque, the fuel consumption and the generation of exhaust gas, is influenced by the definition of the stroke curves.

In addition, characteristic curves, characteristic diagrams and/or integrals for setpoint pressure profiles in the exhaust section 4 are stored in the data memory 9 as a function of an opening and/or closing behavior of the variably controllable outlet valve 6. In this context, different values for the setpoint pressure profile in the exhaust section 4 during correct functioning of the outlet valve 6 can be stored or calculated, for example, as a function of the used opening and closing behavior, for example of a stroke curve.

In order to check the correct method of functioning of the outlet valve 6, the computing unit 8 senses, by means of the pressure sensor 11, the pressure actually prevailing in the exhaust section 4. In addition, the computing unit 8 compares the sensed pressure with a comparison value which is predefined by the setpoint pressure. The setpoint pressure is stored in the data memory 9 or is calculated as a function of parameters of the internal combustion engine and characteristic curves or characteristic diagrams which are stored in the data memory 9.

From the comparison which is carried out it is possible to detect whether the outlet valve is functioning correctly, in particular whether the outlet valve is implementing the opening and closing behavior predefined by the computing unit 8, in particular the predefined stroke curve or the stroke curve predefined by the mechanism of the valve controller.

If the comparison reveals that the measured pressure in the exhaust section differs from the pressure setpoint value, a malfunction of the outlet valve, in particular a malfunction of the variable valve controller of the outlet valve is detected and stored, for example, in a fault memory, is output via an output unit and/or is taken into account in the following combustion process. For example, when a malfunction of the outlet valve 6 is detected it is possible to switch into an emergency running program or the combustion process can be changed in such a way that the malfunction of the outlet valve 6 has less influence, in particular no influence, on the torque output, the fuel consumption and/or the generation of exhaust gas.

Figure 2:
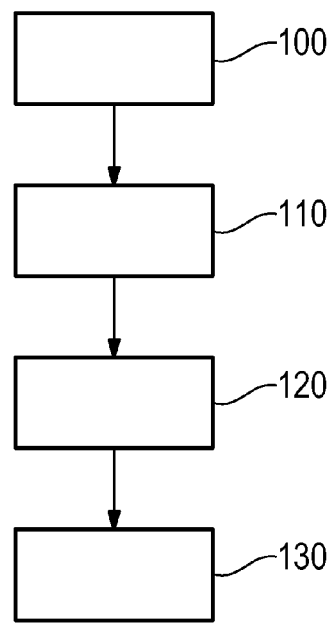
FIG. 2 shows a schematic program sequence for carrying out the method.

FIG. 2 shows in a schematic illustration a program sequence for carrying out the method.

At program point 100, the computing unit 8 controls the injection system 7, the variably controllable inlet valve 5 and the variably controllable outlet valve 6 as a function of a driver's request and as a function of operating conditions of the internal combustion engine 1, in order to generate a torque corresponding to the driver's request. At a following program point 110, the computing unit 8 senses, via the pressure sensor 11, the pressure which is actually present in the exhaust section 4, in particular the pressure profile. At a following program point 120, the computing unit 8 acquires a setpoint value for the pressure, in particular a setpoint value for the pressure profile in the exhaust section 4 as a function of the control of the outlet valve 6. The pressure setpoint value can be stored in the data memory 9 in the form of characteristic curves or characteristic diagrams as a function of the opening behavior of the outlet valve 4, in particular as a function of a stroke curve of the outlet valve 6. In a further embodiment, the computing unit 8 can calculate the setpoint value for the pressure or the setpoint value for the pressure profile in the exhaust section 4 as a function of the opening and closing behavior of the outlet valve 6, in particular as a function of the selected stroke curve of the outlet valve and of further operating conditions of the internal combustion engine such as, for example, the opening behavior of the inlet valve, the sucked-in air quantity and the injected fuel quantity.

Figure 3:
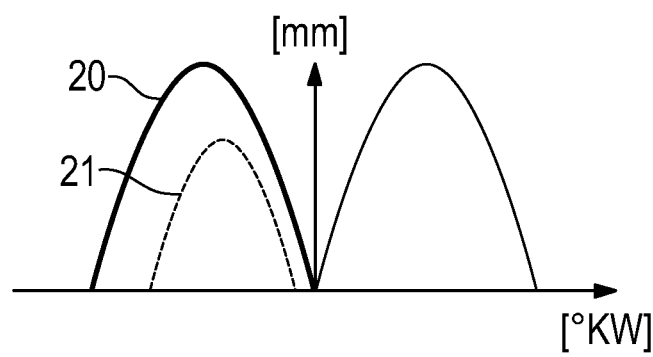
FIG. 3 shows a chronological diagram for two stroke curves of an outlet valve.

FIG. 3 shows a schematic illustration of a diagram in which two stroke curves 20, 21 are plotted for the outlet valve 6 via the crankshaft angle, with which stroke curves 20, 21 the outlet valve 6 can be opened and closed in a variable fashion as a function of the driver's request and of operating conditions of the internal combustion engine. The stroke curve represents opening travel of the outlet valve as a function of the crankshaft angle. The stroke curves 20, 21 differ at the time of opening of the outlet valve 6, in the opening stroke of the outlet valve 6 and at the time of closing of the outlet valve 6. In the illustrated exemplary embodiment, the first stroke curve 20 starts earlier than the second stroke curve 21. In addition, the opening stroke in the case of the first stroke curve 20 is higher than the opening stroke in the case of the second stroke curve 21. Furthermore, the outlet valve closes later in the case of the first stroke curve 20 than in the case of the second stroke curve 21.

Figure 4:
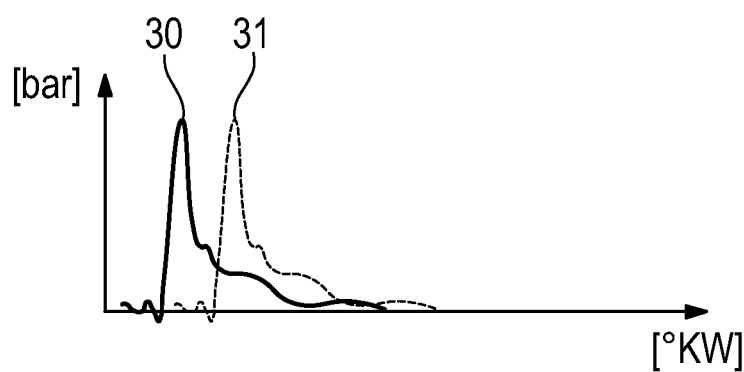
FIG. 4 shows two chronological pressure profiles in the exhaust section for two different stroke curves of the outlet valve.

In FIG. 4, setpoint pressure profiles 30, 31 for the pressure in the exhaust section 40 are illustrated as a function of the used stroke curve 20, 21 for a correct function of the outlet valve 6, said setpoint stroke profiles 30, 31 being stored, for example, in the data memory. In FIG. 4, a first setpoint pressure profile 30 is illustrated for the exhaust section 4 which corresponds to the pressure profile when the first stroke curve 20 is used in the case of a correct function of the outlet valve 6. In addition, a second setpoint pressure profile 31 is illustrated which corresponds to a correct function of the outlet valve when the second stroke curve 21 is implemented. The setpoint stroke profiles 30, 31 have in each case a maximum value of the pressure offset chronologically with respect to the opening time t1 or t2 of the outlet valve 6. This maximum value is referred to as a pre-outlet surge. Both before and after the maximum value the setpoint pressure profile has in each case a high gradient. In order to check a correct function of the outlet valve it is possible, for example, to check whether the measured pressure profile or the pressure at a defined distance from the setpoint opening time of the outlet valve 6 in the exhaust section corresponds to the setpoint pressure profile 30, 31, in particular to a pressure value of the setpoint pressure profile 30, 31.

At program point 130, the computing unit 8 compares the sensed pressure value with a comparison value. The comparison value constitutes, for example, a setpoint pressure value of the setpoint pressure profile 30, 31 at a defined time. In addition, a setpoint pressure gradient can be used as a function of the used embodiment, instead of a pressure value. In addition, an integral over a setpoint pressure profile can also be used as a function of the used embodiment, said setpoint pressure profile being compared with an integral over the measured pressure profile.

In a simple embodiment, the computing unit 8 checks whether the pressure in the exhaust section reaches a specific setpoint pressure value within a predefined time period starting from a setpoint opening time of the outlet valve 6. This setpoint pressure value can correspond, for example, to 75% of the maximum value of the first or second setpoint pressure profile 30, 31. If the comparison value in the exhaust section 4 is not reached, a malfunction of the outlet valve 6 is detected.

In addition, the computing unit 8 can check at what time interval a maximum value in the exhaust section 4 is reached with respect to the setpoint opening time of the outlet valve 6. As a result, it is possible to decide easily, as a function of the time interval, whether the outlet valve 6 has actually implemented the first or the second stroke curve 20, 21. It is therefore possible to detect whether the outlet valve 6 has implemented the stroke curve predefined by the computing unit 8 or the mechanical variable valve controller. If this is not case, the computing unit 8 makes a corresponding entry in the data memory 9, issues an indication to the driver of the vehicle or carries out a change in the control of the combustion by means of the computing unit 8 in order to attenuate or compensate for the malfunction of the outlet valve.

In a corresponding way, a malfunction of the outlet valve 6 can be detected by comparing the measured pressure gradient in the exhaust section 4 with the setpoint pressure gradient which is acquired by means of the data in the data memory. Furthermore, by comparing the measured setpoint pressure integrals with the measured pressure integrals it is possible to detect a malfunction of the outlet valve, in particular a malfunction of the variable valve controller. For example, a plurality of pressure values are sensed in chronological succession in the exhaust section, wherein an integral over the pressure profile in the exhaust section is acquired, and wherein an integral over a setpoint pressure profile is used as a comparison value.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for checking a function of an outlet valve of an internal combustion engine, the method comprising:
controlling an outlet valve so as to have variable timing;
sensing an exhaust gas pressure in an exhaust section of the internal combustion engine;
comparing the sensed exhaust gas pressure with a comparison value so as to provide a comparison result; and
evaluating the function of the outlet valve as a function of the comparison result.

2. The method as recited in claim 1, wherein control of the outlet valve produces a variable stroke curve.

3. The method as recited in claim 1, wherein the pressure is sensed using a pressure sensor.

4. The method as recited in claim 1, wherein a setpoint pressure value is used as the comparison value.

5. The method as recited in claim 1, wherein at least two pressure values are sensed in chronological succession in the exhaust section, wherein a pressure gradient is acquired, and wherein a setpoint pressure gradient is used as the comparison value.

6. The method as recited in claim 1, wherein a plurality of pressure values are sensed in chronological succession in the exhaust section, wherein an integral over the pressure profile in the exhaust section is acquired, and wherein an integral over a setpoint pressure profile is used as a comparison value.

7. The method as recited in claim 1, wherein the comparison value is defined as a function of a time interval between sensing of the pressure value and a setpoint opening time of the outlet valve.

8. The method as recited in claim 1, wherein the comparison value is defined as a function of a setpoint opening behavior of the outlet valve.

9. A tangible non-transient computer-readable medium having computer-executable instructions stored thereon, the computer-executable instructions including instructions for carrying out a method for checking a function of an outlet valve of an internal combustion engine, the method comprising:
- controlling an outlet valve so as to have variable timing;
- sensing an exhaust gas pressure in an exhaust section of the internal combustion engine;
- comparing the sensed exhaust gas pressure with a comparison value so as to provide a comparison result; and
- evaluating the function of the outlet valve as a function of the comparison result.

10. A computing unit configured to carry out a method comprising:
- controlling an outlet valve so as to have variable timing;
- sensing an exhaust gas pressure in an exhaust section of the internal combustion engine;
- comparing the sensed exhaust gas pressure with a comparison value so as to provide a comparison result; and
- evaluating the function of the outlet valve as a function of the comparison result.

* * * * *